(12) United States Patent
Yasoda et al.

(10) Patent No.: US 6,818,858 B2
(45) Date of Patent: Nov. 16, 2004

(54) LASER PROCESSING UNIT AND PROCESSING APPARATUS COMPRISING LASER PROCESSING UNIT

(75) Inventors: Hisashi Yasoda, Ishikawa-ken (JP); Masato Fukushima, Ishikawa-ken (JP)

(73) Assignee: UHT Corporation, Aichi (JP)

( * ) Notice: Subject to any disclaimer, the term of this patent is extended or adjusted under 35 U.S.C. 154(b) by 0 days.

(21) Appl. No.: 10/352,964

(22) Filed: Jan. 29, 2003

(65) Prior Publication Data

US 2003/0160029 A1 Aug. 28, 2003

(51) Int. Cl.[7] .............................................. B23K 26/38
(52) U.S. Cl. .............................. 219/121.7; 219/121.73
(58) Field of Search ........................ 219/121.6, 121.67, 219/121.68, 121.69, 121.7, 121.71, 121.72, 121.73, 121.78, 121.83

(56) References Cited

U.S. PATENT DOCUMENTS 5,004,890 A * 4/1991 Lim ...................... 219/121.83
5,940,957 A * 8/1999 Goto et al. .................. 29/611
5,968,382 A * 10/1999 Matsumoto et al. ... 219/121.72

FOREIGN PATENT DOCUMENTS

JP        401197090 A * 8/1989

* cited by examiner

Primary Examiner—Samuel M. Heinrich
(74) Attorney, Agent, or Firm—Greenblum & Bernstein, P.L.C.

(57) ABSTRACT

There are provided a laser processing unit easily detachable for replacement from the main body of a processing apparatus, excellent in maintainability, and capable of performing an efficient perforating operation and a processing apparatus having the laser processing unit. A casing detachable from the main body 1 of processing apparatus into which a work W is carried is composed integrally of a unit one half portion, a unit other half portion disposed in opposing relation to the unit one half portion with a work insertion space interposed therebetween, and a connecting portion for connecting the unit one half portion and the unit other half portion to each other. Optical means for guiding a laser beam emitted from a laser emission port into a processing area located above the unit other half portion and focusing the guided laser beam therein is provided in the unit one half portion. A beam receiving plate which transmits the laser beam is provided in the processing area.

14 Claims, 9 Drawing Sheets

LASER PROCESSING UNIT AND PROCESSING APPARATUS COMPRISING LASER PROCESSING UNIT

BACKGROUND OF THE INVENTION

1. Field of the Invention

The present invention relates to a laser processing unit for performing perforation with respect to a work in the form of a thin plate by using a laser beam and to a processing apparatus comprising the laser processing unit.

2. Description of the Related Art

A typical conventional laser processing apparatus integrally comprises an XY moving table on which a work is placed, a reflecting mirror and a condenser lens for guiding a laser beam onto the XY moving table and focusing it thereon, a laser oscillator for generating and emitting a laser beam, a control panel for controlling the movement of the XY table and the oscillation of the laser beam, and the like.

However, the foregoing conventional laser processing apparatus has a maintainability problem because of its large-scale and heavy-weight structure integrally comprising the XY moving table, the control panel, and the like.

The large-scale and heavy-weight structure of the foregoing laser processing apparatus has made it difficult to, e.g., move the laser processing apparatus for maintenance or temporarily replace it with an alternative apparatus when it is under faulty conditions.

In a laser processing apparatus adapted to form a plurality of holes in one work at the same time by perforation using a plurality of laser beams, e.g., if the specifications of an optical system for guiding a laser beam to the work is to be changed to increase or decrease the number of the holes that can be formed at the same time, it has been necessary to change the design of the optical system and entirely replace it.

If a relatively large hole and an extremely small hole are to be formed in the same work by perforation, the problem of an elongated processing time is encountered since the focal point of the laser beam is moved along the contour of the large hole during the perforation.

SUMMARY OF THE INVENTION

The present invention has been achieved in view of the foregoing circumstances and the foregoing problems can be solved by providing a laser processing unit easily detachable for replacement from the main body of a processing apparatus, excellent in maintainability, and capable of performing an efficient perforating operation and a processing apparatus comprising the laser processing unit.

The technical means for solving the problem according to the present invention comprises: a casing composed of a unit one half portion, a unit other half portion opposed to the unit one half portion with a work insertion space sandwiched therebetween, and a connecting portion integrally connecting the unit one half portion and the unit other half portion to each other; optical means for guiding a laser beam emitted from a laser emission port into a processing area located above the unit other half portion and focusing or/and imaging the guided laser beam thereon, the optical means being provided in the unit one half portion; and a beam receiving plate for transmitting or absorbing the laser beam, the beam receiving plate being provided in the processing area.

A work to be processed by the present invention includes any material that can be processed by using a laser beam such as a tape, a ceramic green sheet, or the like composing a flexible substrate in a semiconductor device or the like.

The foregoing processing includes any processing that can be performed by using a laser beam such as a cutting process, a perforating process, a scribing process for forming a groove in the surface of the work, or a marking process for making a mark composed of a bottomed hole with a depth of several micrometers in the surface of the work.

The foregoing image formation indicates providing a beam shielding plate with a through hole having a specified configuration in the path of a laser beam, causing the laser beam to pass through the through hole of the beam shielding plate, and projecting the configuration of the through hole onto the work.

Specifically, the foregoing optical means comprises either one or both of a condenser lens for focusing a laser beam on the work and the foregoing beam shielding plate for projecting the configuration of the through hole onto the work.

Preferably, the foregoing casing is composed of a stage, a work moving mechanism, a control circuit, and the like and constructed detachably from the main body of the processing apparatus for easy detachment and attachment, replacement, and movement for maintenance or the like.

With the foregoing technical means, the laser beam oscillated from the laser emission port is guided into the processing area, focused, and transmitted or absorbed by a beam receiving plate in the processing area. If the work is inserted in the work insertion space between the unit one half portion of the casing and the unit other half portion thereof, the work is perforated by the radiation of the laser beam.

In a second aspect of the present invention, a laser oscillator for generating the laser beam is disposed in the connecting portion.

In a third aspect of the present invention, the optical means causes the laser beam emitted from the laser emission port to pass through a corrector lens for correcting the laser beam into a parallel beam, causes the parallel beam to be reflected by a Y-axis scan mirror supported by a rotating shaft of a Y-axis rotating device and by an X-axis scan mirror supported by a rotating shaft of an X-axis rotating device, guides the reflected laser beam into a processing area located above the unit other half portion, and focuses the laser beam thereon by using a condenser lens and respective reflection angles of the X-axis scan mirror and the Y-axis scan mirror can be varied via the X-axis rotating device and the Y-axis rotating device.

In a fourth aspect of the present invention, the laser processing unit is controlled to form gang holes.

In a fifth aspect of the present invention, the optical means comprises beam branching means in a path of the laser beam, guides each of laser beams resulting from branching into the processing area, and focuses each of the guided laser beams thereon.

In a sixth aspect of the present invention, the laser processing unit is controlled to form grid holes.

In a seventh aspect of the present invention, the laser processing unit is configured as a flat rectangular parallelepiped having the processing area formed therein as a depressed portion.

In an eighth aspect of the present invention, the optical means is formed in a cartridge case and the cartridge case is provided detachable from the unit one half portion of the casing.

In a ninth aspect of the present invention, the laser processing unit is disposed on a stage detachably therefrom.

In a tenth aspect of the present invention, the laser processing unit and a punching unit are juxtaposed on the stage and a work is processed by selectively using the laser processing unit or the punching unit.

DESCRIPTION OF THE PREFERRED EMBODIMENT(S)

Referring to the drawings, the embodiments of the present invention will be described.

Figure 1:
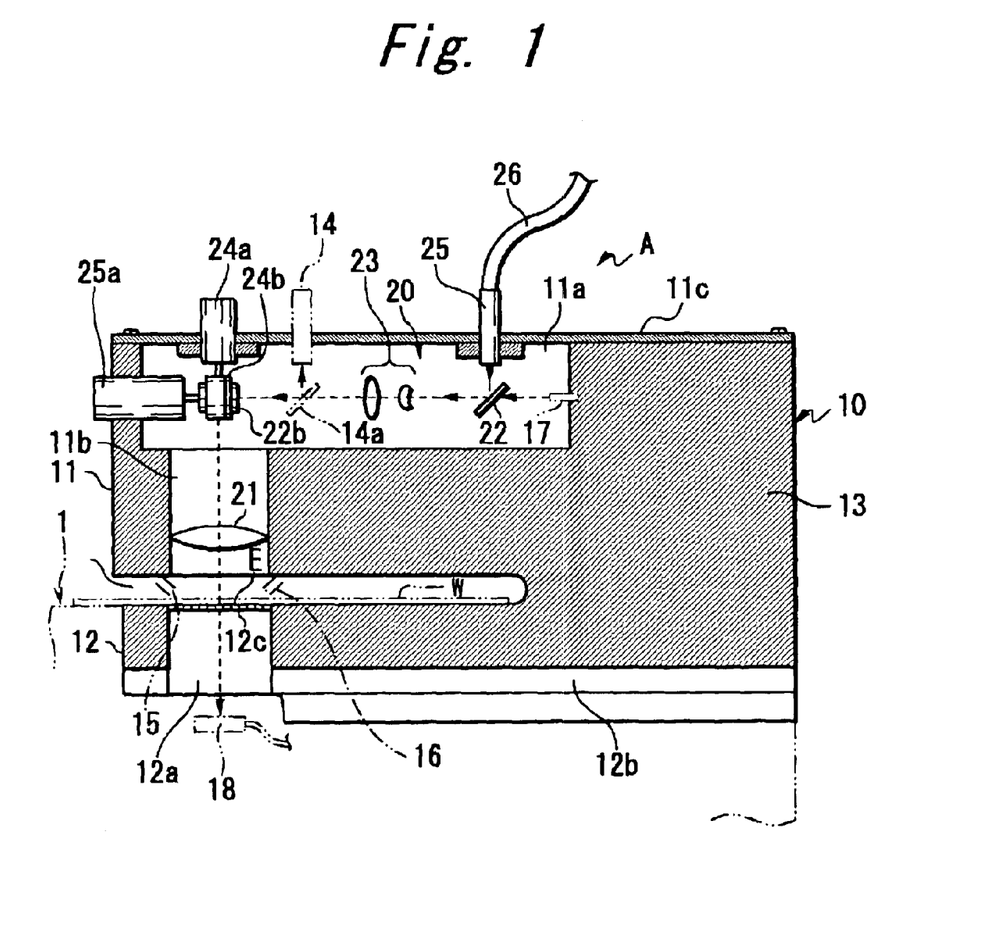
FIG. 1 is a cross-sectional view showing an example of a laser processing unit according to the present invention.
Figure 2:
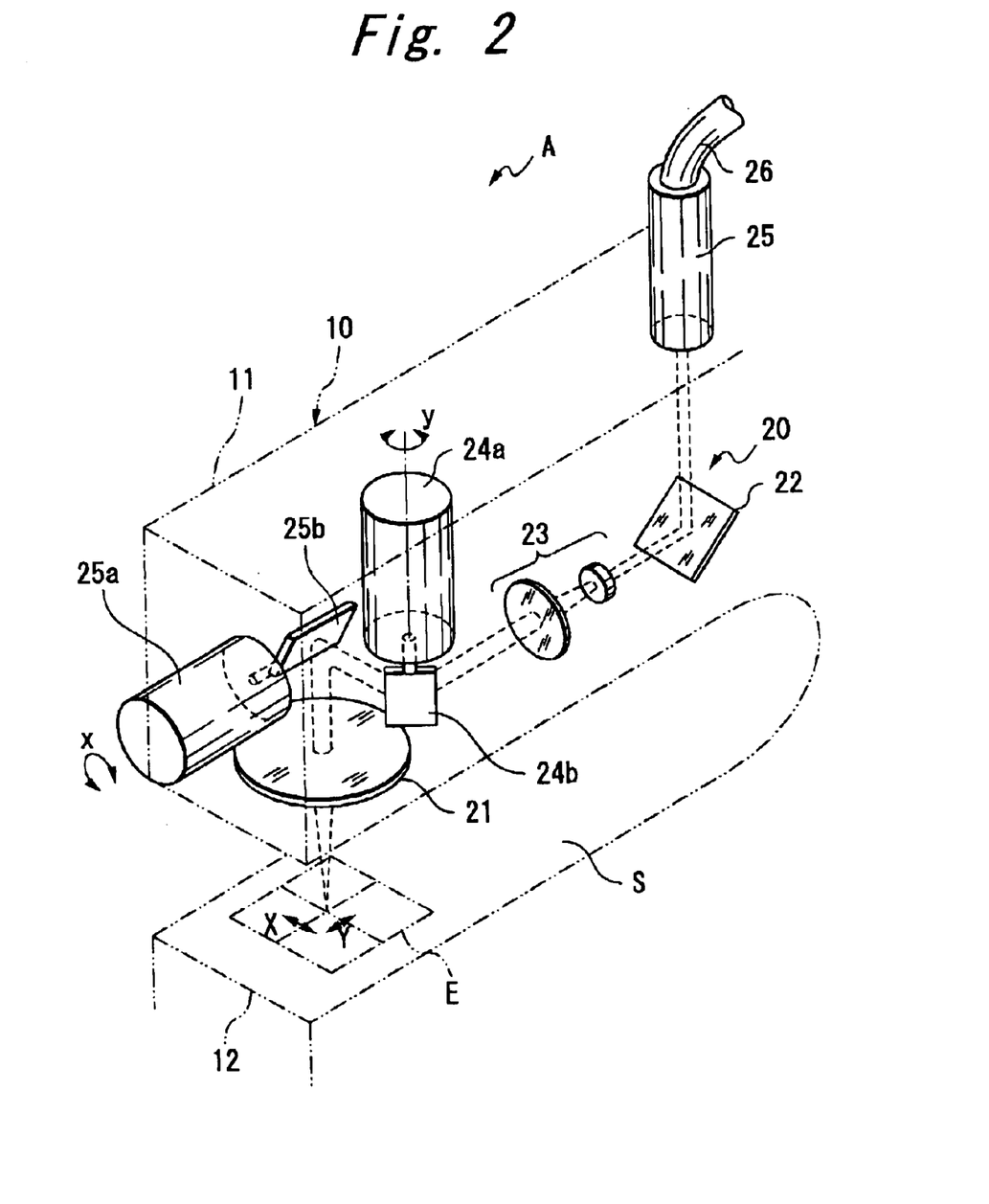
FIG. 2 is a perspective view showing an example of optical means of the laser processing unit.

FIGS. 1 and 2 show an example of a laser processing unit according to the present invention.

The laser processing unit A is a perforating unit comprises a casing 10 detachable from a main body 1 of processing apparatus into which a work W is carried and optical means 20 mounted in the casing 10 to perform perforation with respect to the work W by using a laser beam guided and focused by the optical means 20.

The casing 10 is formed integrally in a U-shaped configuration from a unit one half portion 11, a unit other half portion 12, which are disposed to sandwich a work insertion space S therebetween, and a connecting portion 13 connecting the unit one half portion 11 and the unit other half portion 12 to each other.

The unit one half portion 11 has a space portion having an inverted L-shaped configuration when viewed from the side surface thereof and composed of a refracting space portion 11a in an upper anterior region thereof and a beam focusing space portion 11b in a lower front-end region thereof, which are connecting to each other. The unit one half portion 11 is constructed to focus, in the cylindrical beam focusing space portion 11b, a laser beam guided in the refracting space portion 11a in a rear-to-front direction and directed downward.

In the upper opening of the refracting space portion 11a, a lid member 11c is mounted removably from above for easy maintenance of the optical means 20.

If necessary, a CCD camera 14 is mounted detachably from the lid member 11 on the upper end of the unit one half portion 11 and a reflecting mirror 14a for reflecting, to the CCD camera 14, an image pick-up beam made incident thereon from a Y-axis scan mirror 24b and transmitting the laser beam is disposed in a laser optical patch between a corrector lens 23 and the Y-axis scan mirror 24b. The image of a reference mark on the work W is picked up and processed by the CCD camera 14 such that the work W is moved in an X- or Y-direction under the control of the moving mechanism 1b of the main body 1 of processing apparatus, which will be described later, to have a position thereof corrected.

If necessary, a guided beam emitting portion 17 is disposed detachably from the rear end of the refracting space portion 11b. In that case, the aforementioned reflecting mirror 22 is composed of a mirror or prism capable of transmitting a beam emitted from the beam emitting portion 17.

Specifically, the beam emitting portion 17 is constructed by using a laser diode to apply a dotted beam onto the work and allow a processing position on the work W to be inspected visually. The color of the emitted beam is not limited but a red color is preferred in terms of visual inspectability.

The positions of the CCD camera 14 and the beam emitting portion 17 are not limited to the foregoing but they are preferably placed at the foregoing positions or placed by switching the positions of the CCD camera 14 and the light emitting portion 17 shown in the drawings for such reasons that the image pick-up beam made incident on the CCD camera 14 or the beam emitted from the light-emitting portion 17 can be made coaxial with the laser beam and that changes in positions to which the laser beam is applied by the X-axis scan mirror 25b and the Y-axis scan mirror 24b can be compensated for.

If necessary, an assist gas ejection hole 15 and a suction hole 16 are provided in the work insertion space S.

The assist gas ejection hole 15 operates to prevent the work W from being oxidized by laser processing by ejecting nitrogen gas, argon gas, or the like and guide the work W to the suction hole 16, while blowing off processing residues, a foreign substance, and the like.

The suction hole 16 is the sucking portion of a vacuum sucking device (not shown) and sucks discharged gas, residues, a foreign substance, and the like resulting from laser processing.

The assist gas ejection hole 15 and the suction hole 16 may be supported detachable from the casing 10 or may be supported outside the casing 10.

The unit other half portion 12 has a laser-beam transmitting space portion 12a in the cylindrical beam focusing space portion 11b, which are coaxial with each other, and a groove portion 12b configured as an inverted projection in cross section to removably mount the laser processing unit A on the main body of the processing apparatus.

The laser-beam transmitting space portion 12a downwardly transmits a laser beam when it is emitted downwardly from the unit one half portion 11.

The perforation performed by the laser processing unit A may be for forming a through hole or a bottomed hole in the work W.

In the case of forming a through hole in the work W, the laser beam is applied through the work W and transmitted into the laser-beam transmitting space portion 12a.

In the case of forming a bottomed hole, such as a via hole, in the work W, the laser beam is emitted intermittently. By controlling the number of emission of the laser beam, the depth of the bottomed hole can be determined.

A beam receiving plate 12c capable of transmitting a laser beam is mounted in the upper-end open surface of the laser-beam transmitting space portion 12a so that a space located above the beam receiving plate 12c serves as a processing area E.

The beam receiving plate 12c is a metal member configured as a net plate to transmit a laser beam through the meshes of the net. The beam receiving plate 12c is attached removably from the unit other half portion 12 such that it is replaced when it is degraded by the laser beam.

The beam receiving plate 12 need not be configured as a net plate as described above provided that it is composed of a material transmitting a laser beam. For example, the beam receiving plate 12 may be a glass plate in a color capable of transmitting a laser beam. In the case of using this structure, a laser beam sensing portion 18 is provided preferably under the glass plate. The laser beam sensing portion 18 is a well known sensor which senses the intensity of the laser beam such that the intensity of the laser beam generated from a laser oscillator (not shown) is adjusted properly under feedback control.

Although the structure in which the laser beam is transmitted by the beam receiving plate 12c has been shown above by way of example, the transmitting plate 12c may also be formed from a material which absorbs a laser beam such as a black plate-like member.

The optical means 20 reflects, in a forward direction, the laser beam emitted downwardly from the laser emission port 25 inserted in the unit one half portion 11 in penetrating relation by using the reflecting mirror 22 such that the laser beam passes through the corrector lens 23. The laser beam is then reflected successively by the Y-axis scan mirror 24b supported by the rotating shaft of a Y-axis rotating device 24a and by the X-axis scan mirror 25b supported by the rotating shaft of an X-axis rotating device 25a to be guided into the processing area E located above the unit other half portion 12 and focused by the condenser lens 21.

The laser emission port 25 is mounted removably from the lid member 11c of the unit one half portion 11 in penetrating relation to have the front end portion thereof directed downward in the refracting space portion 11a and emits the laser beam propagated by an optical fiber cable 26 connected to the rear end portion thereof from the front end portion thereof.

Although the present embodiment has provided the laser oscillator (not shown) as an oscillation source of the laser beam in the main body 1 of processing apparatus such that the laser beam emitted from the laser oscillator is guided by the optical fiber cable 26 to be emitted from the front end portion of the laser emission port 25, the laser oscillator may also be connected directly to the rear end of the laser emission port 25.

As the laser oscillator, a laser oscillator having a well-known structure such as a YAG laser oscillator or $CO_2$ laser oscillator may be used appropriately. If a laser beam is guided to the laser emission port 25 via the optical fiber cable 26, however, a laser oscillator which generates a laser at a wavelength (400 to 3000 nanometers) capable of passing through the optical fiber cable 26 is used preferably.

It is also possible to use a $CO_2$ laser by composing the optical fiber cable 26 of a fiber cable for the $CO_2$ laser.

The foregoing laser oscillator can be composed of a single or a plurality of laser oscillators. For example, it is also possible to branch a laser beam emitted from the laser oscillator 90 by using beam branching means (not shown) composed of a prism or the like and supply a plurality of laser beams resulting from the branching to a plurality of the laser processing units A via the respective optical fiber cables 26, as shown in FIG. 10A.

Figure 10A:
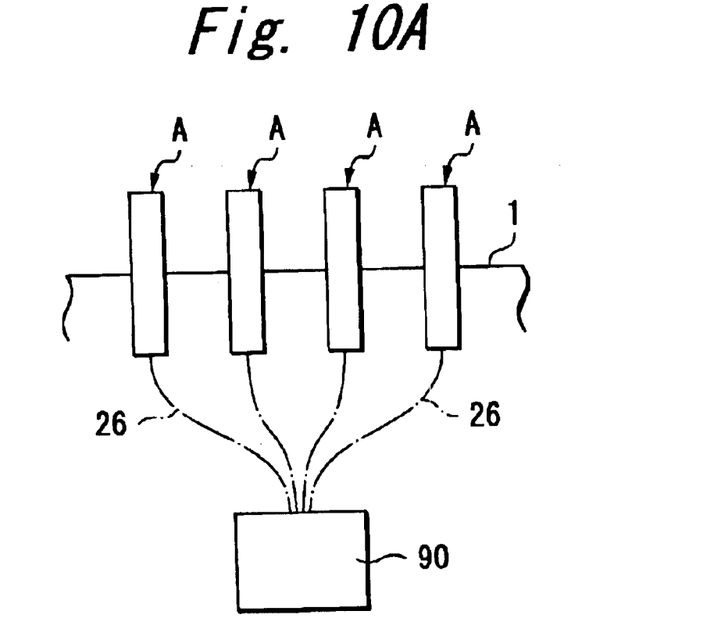
FIG. 10A is a schematic plan view showing an example in which a laser beam emitted from a single laser oscillator is supplied in divided relation to a plurality of laser processing units.
Figure 10B:
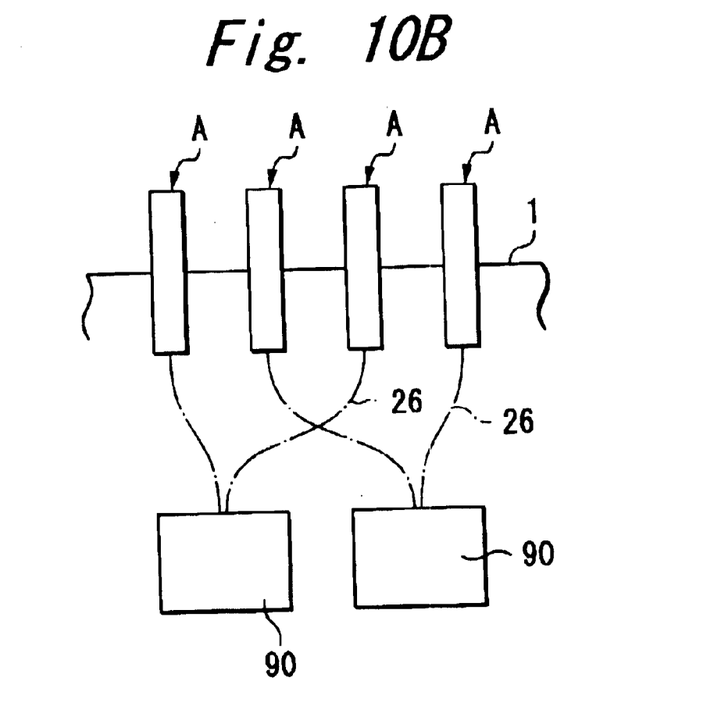
FIG. 10B is a schematic plan view showing an example in which laser beams emitted from a plurality of laser oscillators are supplied individually in divided relation to a plurality of laser processing units.

Alternatively, it is also possible to branch each of laser beams emitted from a plurality of the laser oscillators 90 by using beam branching means (not shown) composed of a prism or the like and supply a plurality of laser beams resulting from the branching to a plurality of the laser processing units A via the respective optical fiber cables 26, as shown in FIG. 10B.

In the case of using this structure, if the plurality of laser oscillators 90 are adapted to have different laser outputs such that the laser oscillator 90 with a low capacity is used for the laser processing unit A for forming a hole relatively small in diameter by perforation and that the laser oscillator 90 with a large capacity is used for the laser processing unit A for forming a hole relatively large in diameter by perforation, a laser processing apparatus low in energy loss can be constructed.

In the structure illustrated in FIG. 10A or 10B, if an interrupting device (not shown) for interrupting a laser beam is provided in intervening relation in each of the optical fiber cables 26, processing operations performed by the plurality of laser processing units A can be interrupted selectively as required.

The reflecting mirror 22 is a mirror supported at a tilt angle of generally 45 degrees in the refracting space portion 1a to reflect, in a forward direction, the laser beam emitted downwardly from the front end portion of the laser emission port 25. A prism may also be used instead provided that it exerts a similar optical effect.

The corrector lens 23 corrects a laser beam into a parallel beam by using a single lens or a plurality of lenses in combination. As the corrector lens 23, a beam expander lens which enlarges the diameter of the laser beam, changes it into a parallel beam, and thereby provide a parallel laser beam having a small divergence angle is used preferably.

The Y-axis rotating device 24a is a galvanometer, a servo motor, or the like constructed to have the rotation angle of the rotating shaft thereof variable. The Y-axis scan mirror 24b is a mirror fastened to the rotating shaft. The Y-axis rotating device 24a and the Y-axis scan mirror 24b are disposed to have their axes vertical such that the laser beam is reflected by the Y-axis scan mirror 24b and guided to the X-axis scan mirror 25b and mounted in the unit one half portion 11 of the casing 10 in penetrating relation.

The Y-axis rotating device 24a is connected electrically to the control circuit (not shown) of the main body 1 of processing apparatus and can vary the reflection angle of the Y-axis scan mirror 24b by controlling the rotation angle of the rotating shaft thereof.

The X-axis rotating device 25a and the X-axis scan mirror 25b are composed of structures similar to those of the Y-axis rotating device 24a and the Y-axis scan mirror 24b. The X-axis rotating device 25a and the X-axis scan mirror 25b are disposed to have their axes horizontal such that a laser beam reflected by the Y-axis scan mirror 24b is further reflected downward by the X-axis scan mirror 25b and mounted in the front end of the unit one half portion 11 of the casing 10 in penetrating relation.

The X-axis scan mirror 25b is connected electrically to the control circuit (not shown) of the main body 1 of processing apparatus, similarly to the Y-axis rotating device 24a, and can vary the reflection angle thereof by controlling the rotation axis of the rotating shaft thereof.

The condenser lens 21 is a so-called fθ lens which makes the laser beam used for scanning performed by the X-axis scan mirror 25b incident at generally right angles on the processing area E and focusing it on the work W. The condenser lens 21 is fixed by well-known fixing means (not shown) in the beam focusing space portion 11b. Although the condenser lens 21 is composed of a single lens according to the illustration, it may be composed of a plurality of lenses if necessary.

In the laser processing unit A thus constructed, the reflection angle of the Y-axis scan mirror 24b varies with the rotation angle of the Y-axis rotating device 24a being controlled. As a result, the position (see FIG. 2) of the laser beam in the Y-direction used to scan the processing area E varies.

With the rotation angle of the X-axis rotating device 25a being controlled in the same manner, the reflection angle of the X-axis scan mirror 25b varies so that the position (see FIG. 2) of the laser beam in the X direction used to scan the processing area E varies.

Figure 8A:
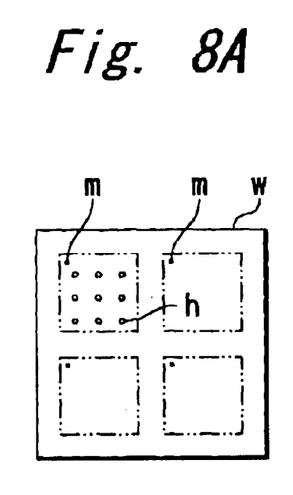
FIGS. 8A, 8B, 8C are plan views showing an example of the procedure of forming gang holes in a work by perforation.
Figure 8B:
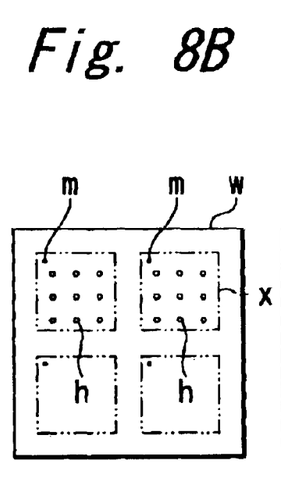
Figure 8C:
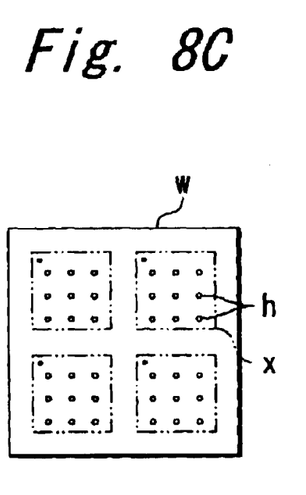

Since the laser processing unit A is capable of forming a hole by perforation in an arbitrary position in a specified region by moving the Y-axis rotating device 24a and the X-axis rotating device 25a under control, it is suitable for use in forming gang holes illustrated in FIG. 8. The gang holes are formed by providing a plurality of specified regions x on the work W and forming a plurality of holes h in succession.

A detailed description will be given to an example of the procedure of forming the gang holes by perforation using the laser perforating unit A. First, as illustrated in FIG. 8A, the plurality of holes h are formed in one of the specified regions x on the work W by using the laser processing unit A. In that case, the individual holes h in the specified region x are formed successively at respective coordinate positions based on a reference mark m provided preliminarily on the work W. In that case, the individual coordinate positions are determined by moving the Y-axis rotating device 24a and X-axis rotating device 25a of the laser processing unit A under control.

After perforation for forming the holes in the specified region x is completed, the work W is moved by a given pitch and perforation for forming a plurality of holes in another specified region x is performed in the same manner as described above, as illustrated in FIG. 8B. It follows that perforation for forming a plurality of holes is performed finally with respect to each of the plurality of specified regions x, as illustrated in FIG. 8C.

Figure 3:
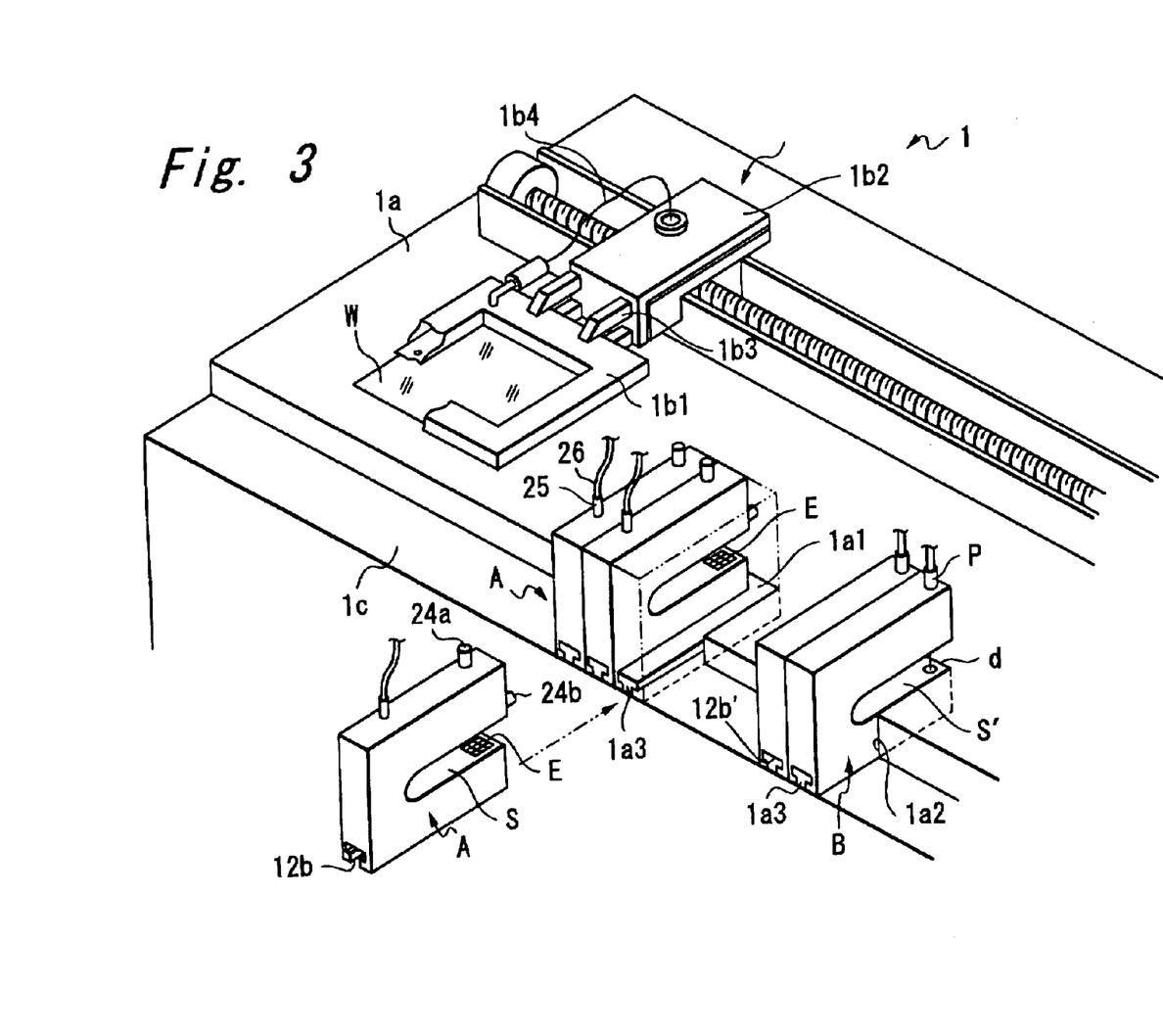
FIG. 3 is a perspective view showing a processing apparatus comprising the laser processing unit.

A description will be given next to the main body 1 of processing apparatus to and from which the laser processing unit A thus constructed is attached and detached.

The main body 1 of processing apparatus is constituted by: the foregoing laser processing unit A and a punching unit B mounted detachably on a unit mounting surface 1c which is lower in level at the front end portion thereof than the upper surface of a stage 1a used as a reference surface; and a moving mechanism 1b composed of a suction/release workholder 1b1 clamped rearwardly of the laser processing unit A and the punching unit B such that the suction/release workholder 1b1 is movable in an X- or Y-direction under control. The main body 1 of processing apparatus sucks the work W (not shown) fed out upwardly from within the stage 1a by means of the suction workholder 1ba, transports the work W by means of the moving mechanism 1b, and selectively inserts the work W in the work insertion space S, S' of the laser processing unit A or the punching unit B.

The moving mechanism 1b comprises two pairs of upper and lower dampers 1b3, 1b3 on the front surface of a moving member 1b2 which is movable under control in a ball screw system in either of the X-axis and Y-axis directions, though the detailed description thereof is omitted, so that the suction workholder 1b1 is held between the two pairs of dampers 1b3, 1b3.

The suction/release workholder 1b1 is composed of a hollow inner portion and a large number of suction holes formed in the back surface (lower surface) thereof and sucks and releases the work W when the inner air is sucked and exhausted by a suction/exhaust tube 1b4 mounted between the suction/release workholder 1b1 and the moving mechanism 1b.

The stage 1a is formed with a depressed portion 1a1 for mounting laser unit and a depressed portion 1a2 for mounting punching unit. The depressed portion 1a1 for mounting laser unit and the depressed portion 1a2 for mounting punching unit have their bottom surfaces flush with the upper surface of the unit mounting surface 1c.

A plurality of unit guide rails 1a3 are fastened to each of the bottom surfaces of the depressed portion 1a1 for mounting laser unit and the depressed portion 1a2 for mounting punching unit.

Each of the unit guide rails 1a3 is formed to have a T-shaped cross section to be engaged with a groove portion 12b in the bottom surface of the laser processing unit A. A groove portion 12b' similar to the groove portion 12b in the laser processing unit A is formed also in the bottom surface of the punching unit B to be engaged with the unit guide rail 1a3.

Each of the laser processing unit A and the punching unit B is slid in the Y-direction and mounted on the main body 1 of processing apparatus by engaging the groove portions 12b and 12b' with the unit guide rails 1a3 from the front end portions thereof. In the engaged state, the upper surface of the processing area E of the laser processing unit A and the upper surface of the die d of the punching unit B are made flush with the upper surface of the stage 1a.

The punching unit B is a perforating unit with a well-known structure having a generally U-shaped configuration when viewed from the side surface thereof which is equipped with punches at the upper half part thereof and dies d at the lower half part thereof in opposing relation thereto. Grooves 12b' to be removably engaged with the unit guide rails 1a3 of the main body 1 of processing apparatus are formed in the bottom surface of the punching unit B.

Since the laser processing unit A or the punching unit B is constructed detachably from the main body 1 of processing apparatus thus constructed, the changing of the number of the mounted units, the maintenance or replacement of each of the units, and the like are performed easily.

Since the laser processing unit A and the punching nit B are juxtaposed, the work W can be inserted selectively in the work insertion space S of the laser processing unit A or in the work insertion space S' of the punching unit B under the control of the moving mechanism 1b. This allows selective use of the laser processing unit A or the punching unit B as required by, e.g., forming a hole with an extremely small diameter by perforation using the laser processing unit A and forming a hole with a relatively large diameter, which requires a long perforation time, by using the punching unit B.

Although the depressed portion 1a1 for mounting laser unit and the depressed portion 1a2 for mounting punching unit are provided discretely according to the foregoing embodiment, it is also possible to juxtapose the laser processing unit A and the punching unit B in mixed relation in a single depressed portion for mounting.

Figure 4:
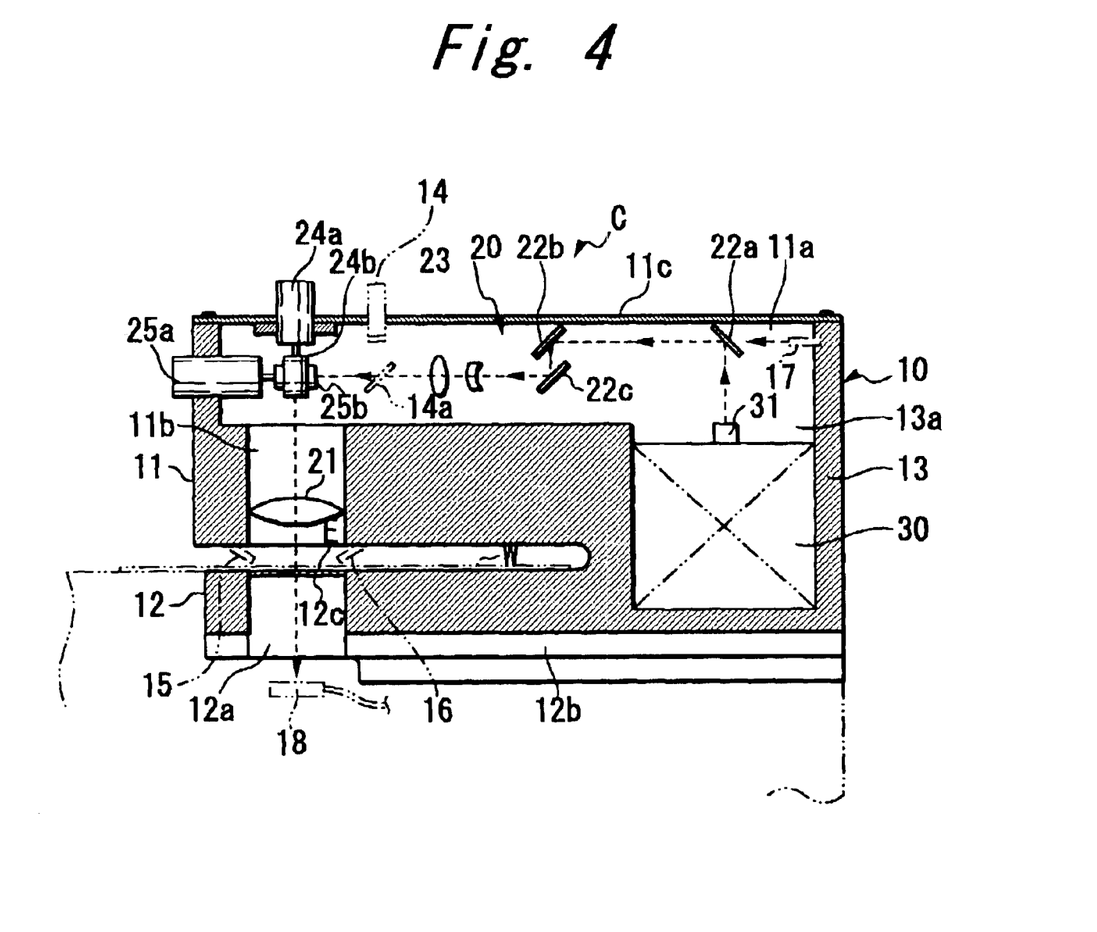
FIG. 4 is a cross-sectional view showing another example of the laser processing unit according to the present invention.

A description will be given next to another example of the laser processing unit shown in FIG. 4.

The laser processing unit C is constructed to be internally provided with a laser oscillator 30 as an oscillation source of a laser beam. The overlapping description of the same parts as composing the laser processing unit A will be omitted by retaining the same reference numerals.

The laser processing unit C comprises a casing 10' detachable from the main body 1 of processing apparatus into which the work W is carried, optical means 20' to be mounted in the casing 10', and the laser oscillator 30. The laser processing unit C guides a laser beam emitted from the laser oscillator 30 to the processing area E by using the optical means 20' and focus it thereon to perform perforation with respect to the work W.

The structure of the casing 10' is obtained by adding a laser-oscillator mounting space portion 13a to the structure of the casing 10.

The laser-oscillator mounting space portion 13a is a space formed in the connecting portion 13 connecting the unit one half portion 11 and the unit other half portion 12 to each other to have an upper end thereof connecting to the rear end of the refracting space portion 11a.

As the laser oscillator 30 in the laser-oscillator mounting space portion 13a, a laser oscillator with a well-known structure such as a YAG laser oscillator or a $CO_2$ laser may be used appropriately. The laser oscillator 30 is disposed to upwardly emit a laser beam from a laser emission port 31 provided integrally in the upper end portion thereof.

The optical means 20 is constructed to cause the laser beam emitted from the laser emission port 31 of the laser oscillator 30 to be reflected successively by a plurality of reflecting mirrors 22a, 22b, and 22c, guide the reflected laser beam to the center of the corrector lens 23, cause the laser beam that has passed through the corrector lens 23 to be reflected successively by the Y-axis scan mirror 24b supported by the rotating shaft of the Y-axis rotating device 24a and by the X-axis scan mirror 25b supported by the rotating shaft of the X-axis rotating device 25a, guide the reflected laser beam into the processing area E located above the unit other half portion 12, and focus it by using the condenser lens 21.

The foregoing plurality of reflecting mirrors 22a, 22b, and 22c may be composed of a single reflecting mirror or a single or a plurality of prisms provided that the laser beam emitted from the laser emission port 31 of the laser oscillator 30 is guided to the center of the corrector lens 23 thereby.

Since the foregoing laser processing unit C is thus internally provided with the laser oscillator 30 and constructed detachable from the main body 1 of processing apparatus, the maintenance of each of the optical means 20' and the laser oscillator 30 can be performed easily by removing the laser processing unit C from the main body 1 of processing apparatus.

Figure 5:
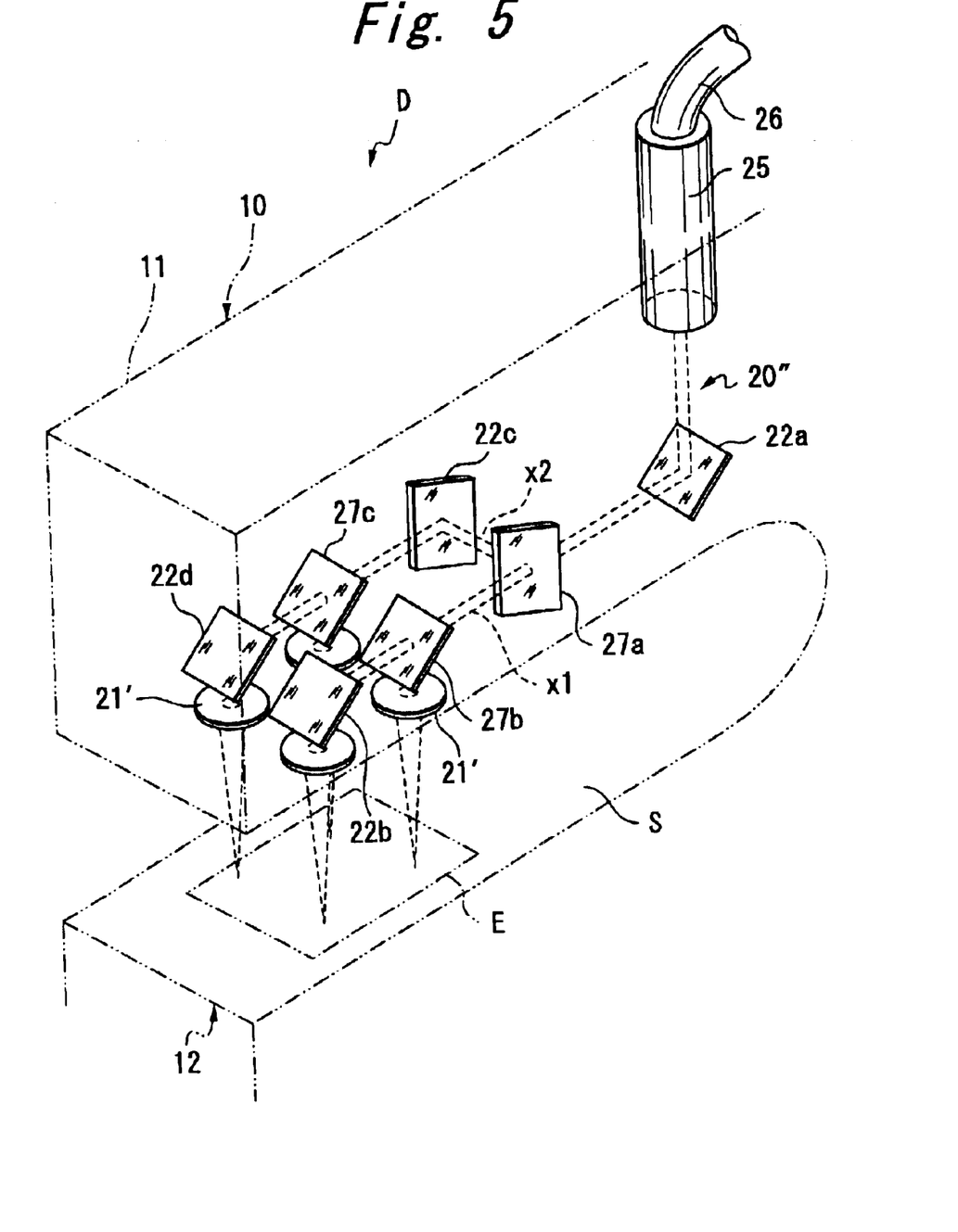
FIG. 5 is a perspective view showing another example of the optical means.

A description will be given next to still another example of the laser processing unit shown in FIG. 5.

Since the laser processing unit D is obtained by replacing the optical means 20 of the foregoing laser processing unit with optical means 20", the overlapping description of the parts composing the laser processing unit D other than the optical means 20" will be omitted by retaining the same reference numerals.

The optical means 20" comprises beam branching means such as a first branching mirror 27a, a second branching mirror 27b, a third branching mirror 27c, and the like in the path of a laser beam.

The optical means 20" reflects, in a forward direction, the laser beam emitted downwardly from the laser emission port 25 inserted in the unit one half portion 11 in penetrating relation by using the first reflecting mirror 22a and branches the reflected laser beam into a first beam path x1 in the forward direction and a second beam path x2 in a direction orthogonal to the first beam path x1 by using the first branching mirror 27a.

The optical means 20" further branches the laser beam in the first beam path x1 into forward and downward directions by using the second branching mirror 27b and downwardly reflects the laser beam in the forward direction resulting from the branching by using the second reflecting mirror 22b.

The optical means 20" also reflects, in the forward direction, the laser beam in the second beam path x2 by using the third reflecting mirror 22c, further branches the laser beam in the forward direction in the forward and downward directions by using the third branching mirror 27c, and downwardly reflects the laser beam in the forward direction resulting from the branching by using a fourth reflecting mirror 22d.

Each of the laser beams branched in the four downward paths as described above is focused in the processing area E by a condenser lens 21' disposed in each of the downward paths.

As the foregoing first to fourth reflecting mirrors 22a, 22b, 22c, and 22d and the first to third branching mirrors 27a, 27b, and 27c, mirrors or prisms each with a well-known structure are used.

The laser processing unit D thus mounted removably from the main body 1 of processing apparatus is excellent in maintainability, similarly to the laser processing units A and B described above. In addition, the laser processing unit D is capable of forming a plurality of holes at the same time by perforation using the plurality of branched laser beams.

Figure 9A:
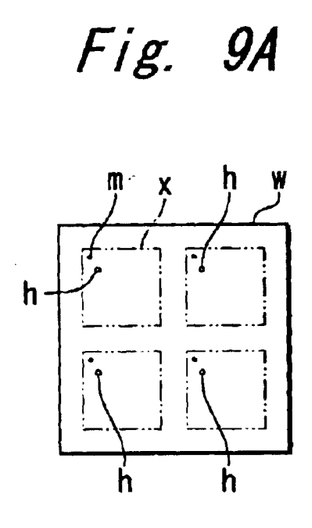
FIGS. 9A, 9B, 9C are plan views showing an example of the procedure of forming grid holes in a work by perforation.
Figure 9B:
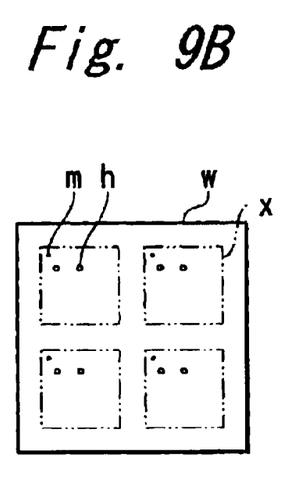
Figure 9C:
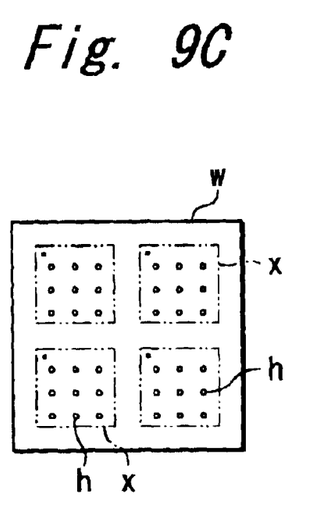

Since the laser perforating unit D is capable of simultaneously forming a plurality of holes, it is suitable for use in forming the grid holes illustrated in FIG. 9. The grid holes are formed by providing a plurality of specified regions x on the work W, performing simultaneous perforation with respect to the same coordinate positions in the respective regions, and repeating the simultaneous perforation a plurality of times.

An example of the procedure of forming the grid holes by perforation using the laser perforating unit D will be described in detail. First, as illustrated in FIG. 9A, perforation is performed with respect to the same coordinate positions in the respective regions by using the laser perforating unit D. The coordinate position of one of the holes h formed in that case is determined based on the reference mark m provided in one of the specified regions x. The coordinate position of another of the holes h formed simultaneously in that case is fixed by the placement of the optical branching means of the laser perforating unit D.

Next, the work W is moved under control in a specified X- or Y-direction so that the second hole is formed simultaneously at the same coordinates in each of the four specified regions x by the laser perforating unit D, as illustrated in FIG. 9B.

By repeating the X- or Y-movement of the work W and the simultaneous perforation performed by the laser perforating unit D, the grid holes illustrated in FIG. 9C are formed.

Figure 6:
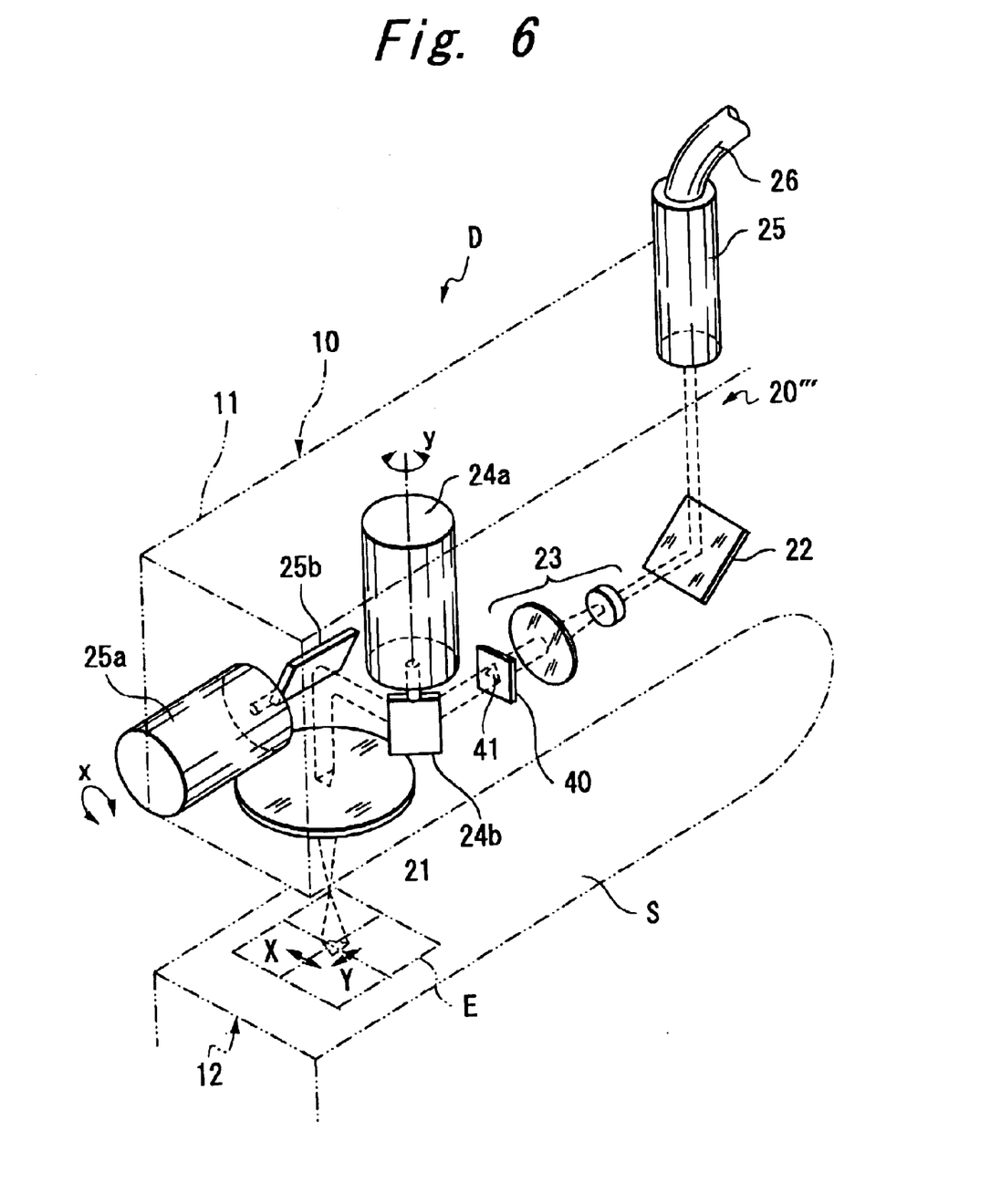
FIG. 6 is a perspective view showing still another example of the optical means.

A description will be given next to yet another example of the laser processing unit shown in FIG. 6.

Since the structure of the laser processing unit E is obtained by adding a beam shielding plate 40 to the optical means 20 of the laser processing unit A, the overlapping description of the parts composing the laser processing unit E other than the beam shielding plate 40 will be omitted by retaining the same reference numerals.

The beam shielding plate 40 is obtained by processing a well-known material which does not transmit a laser beam into a plate-like configuration and forming a through hole 41 having a specified configuration in the generally central portion thereof. The beam shielding plate 40 is disposed in the path of the laser beam between the corrector lens 23 and the Y-axis scan mirror 24b and fixed removably.

As a result, the laser beam emitted downwardly from the laser emission port 25 and reflected in the forward direction by the reflecting mirror 22 to pass through the corrector lens 23 has a portion thereof shielded by the outer circumferential portion of the through hole 41 in the beam shielding plate 40 and another portion thereof allowed to pass through the through hole 41.

The laser beam that has passed through the through hole 41 is reflected successively by the Y-axis scan mirror 24b supported by the rotating shaft of the Y-axis rotating device 24a and by the X-axis scan mirror 25b supported by the rotating shaft of the X-axis rotating device 25a, thereby guided in the direction of the processing area E, focused and rediffused at a midway position between the condenser lens 21 and the processing area E by the condenser lens 21, and then applied, in the form of the through hole 41, to the processing area E.

Thus, the laser processing unit E allows a hole having a configuration conformal to the through hole 41 in the shielding plate 40 to be formed in a short period of time and allows the configuration of the hole to be changed easily by replacing the shielding plate 40 with another shielding plate formed with a through hole in a different configuration.

Figure 7:
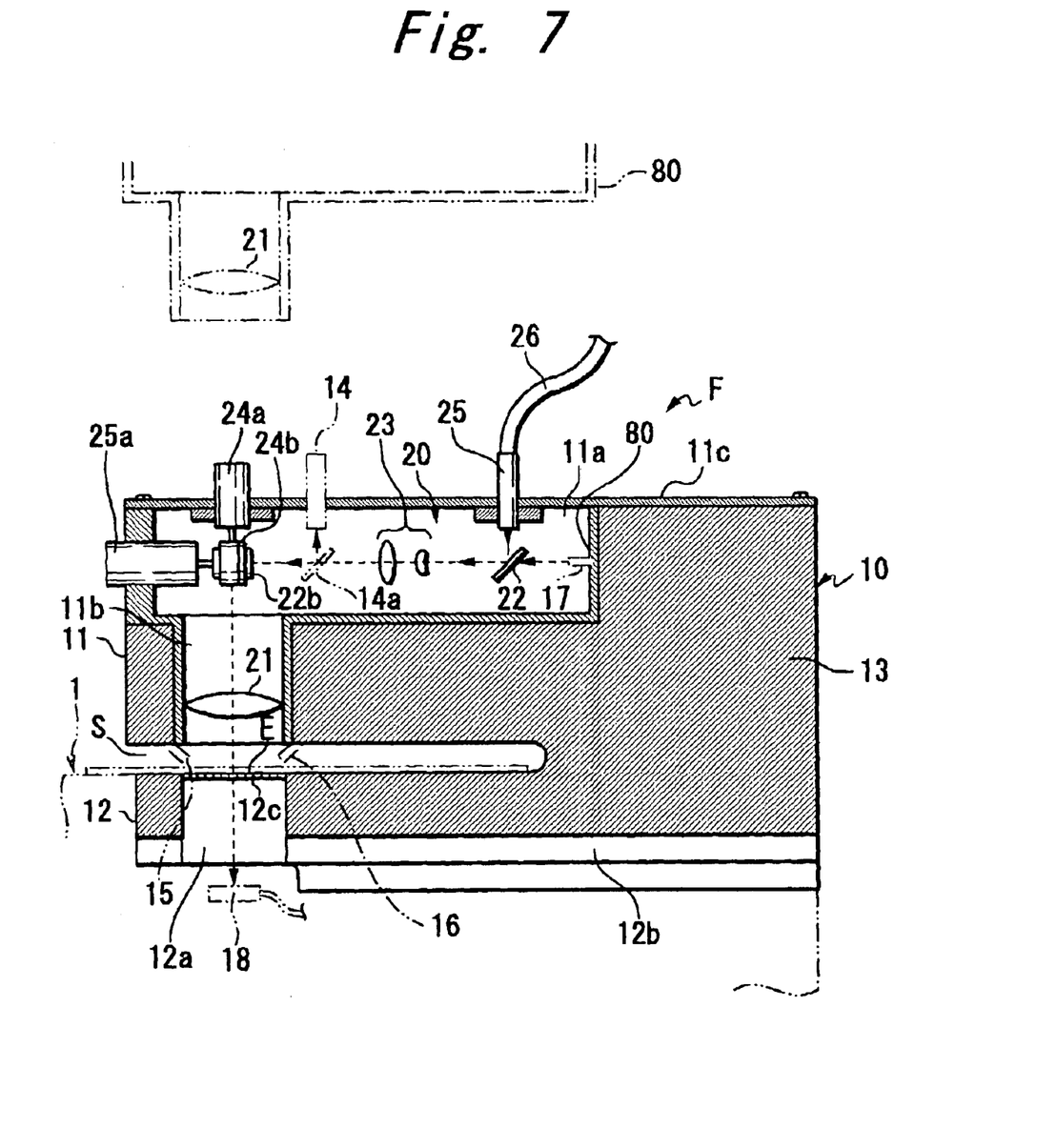
FIG. 7 is a cross-sectional view showing still another example of the laser processing unit according to the present invention.

A description will be given next to another example of the laser processing unit shown in FIG. 7.

Since the structure of the laser processing unit F is obtained by adding a cartridge case 80 to the foregoing laser processing unit A, the overlapping description of the parts composing the laser processing unit F other than the cartridge case 80 will be omitted by retaining the same reference numerals.

The cartridge case 80 is a hollow member having a refracting space portion 11a and a beam focusing space portion 11b and formed detachable from the unit one half portion 11 of the casing. The inner space (including the refracting space portion 11a and the focusing space portion 11b) of the cartridge case 80 is provided with the optical means with the foregoing structure.

Since the optical means is detachable, together with the cartridge case, from the casing in the laser processing unit F, the optical means can be detached easily for replacement for changing the specifications of the optical means as required, repairing the optical means, or the like.

Although the laser processing units D, E, and F each having a structure unprovided with an inner laser oscillator has been shown by way of example, they may have a structure internally provided with the laser oscillator 30 in the same manner as in the laser processing unit C.

The present invention thus constructed achieves the following effects.

In a first aspect, the present invention is an integral unit structure equipped with the optical means and the like so that it is easily detachable from the main body of processing apparatus for replacement. For example, operations including maintenance and adjustment can be performed easily with respect to the optical means and the laser processing unit can be replaced easily with a new one or another one with different specifications with the laser processing unit being detached from the main body of processing apparatus.

If a plurality of the laser processing units are juxtaposed on the main body of processing apparatus, a plurality of holes can be formed simultaneously in a single work by perforation and the number of holes that can be formed simultaneously can be changed easily by increasing or decreasing the number of the laser processing units.

In a second aspect of the present invention, the laser oscillator can be handled integrally with the unit so that maintainability is further improved.

In a third aspect of the present invention, the reflection angle of each of the X-axis scan mirror and the Y-axis scan mirror can be varied. This allows easy changing of the position, configuration, or the like of a hole to be formed.

In a fourth aspect of the present invention, gang holes consisting of a large number of holes can be formed efficiently by varying the reflection angle of each of the X-axis scan mirror and the Y-axis scan mirror and thereby varying the positions of the holes.

In a fifth aspect, the present invention is a structure which guides each of laser beams resulting from branching performed by beam branching means to a processing area and focuses it thereon so that a plurality of holes are formed simultaneously in a short period of time.

In a sixth aspect of the present invention, grid holes can efficiently be formed by effectively using the characteristics of beam branching means.

In a seventh aspect of the present invention, the laser processing unit is configured as a flat rectangular parallelepiped. This allows a larger number of the units to be juxtaposed in the limited mounting region of the main body of processing apparatus.

In an eighth aspect of the present invention, a cartridge case equipped with optical means is detachable from the casing. This allows the optical means to be, e.g., replaced together with the cartridge case as required and further improves the maintainability.

In a ninth aspect of the present invention, there is provided a laser processing apparatus which allows easy maintenance, including the detachment of a laser processing unit for replacement, to be performed thereto.

In a tenth aspect of the present invention, an efficient perforating operation can be performed by selectively using the laser processing unit and a punching unit as required. By forming a hole with an extremely small diameter by perforation using the laser processing unit and forming a hole with a relatively large diameter, which requires a long perforation time, by using the punching unit, e.g., an efficient perforating operation pattern can be selected.

In an eleventh aspect of the present invention, a laser beam emitted from a laser oscillator is used in divided relation via optical fiber cables so that a low-cost structure quipped with a minimum required number of laser oscillators is provided.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. A laser processing unit comprising:
    a casing composed of a unit one half portion, a unit other half portion opposed to the unit one half portion with a work insertion space sandwiched therebetween, and a connecting portion integrally connecting the unit one half portion and the unit other half portion to each other;
    optical means for guiding a laser beam emitted from a laser emission port into a processing area located above the unit other half portion and focusing or/and imaging the guided laser beam thereon, the optical means being provided in the unit one half portion; and
    a beam receiving plate for transmitting or absorbing the laser beam, the beam receiving plate being provided in the processing area.

2. The laser processing unit according to claim 1, wherein a laser oscillator for generating the laser beam is disposed in the connecting portion.

3. The laser processing unit according to claim 1, wherein the optical means causes the laser beam emitted from the laser emission port to pass through a corrector lens for correcting the laser beam into a parallel beam, causes the parallel beam to be reflected by a Y-axis scan mirror supported by a rotating shaft of a Y-axis rotating device and by an X-axis scan mirror supported by a rotating shaft of an X-axis rotating device, guides the reflected laser beam into a processing area located above the unit other half portion, and focuses the laser beam thereon by using a condenser lens and
    respective reflection angles of the X-axis scan mirror and the Y-axis scan mirror can be varied via the X-axis rotating device and the Y-axis rotating device.

4. The laser processing unit according to claim 2, wherein the optical means causes the laser beam emitted from the laser emission port to pass through a corrector lens for correcting the laser beam into a parallel beam, causes the parallel beam to be reflected by a Y-axis scan mirror supported by a rotating shaft of a Y-axis rotating device and by an X-axis scan mirror supported by a rotating shaft of an X-axis rotating device, guides the reflected laser beam into a processing area located above the unit other half portion, and focuses the laser beam thereon by using a condenser lens and
    respective reflection angles of the X-axis scan mirror and the Y-axis scan mirror can be varied via the X-axis rotating device and the Y-axis rotating device.

5. The laser processing unit according to claim 3, which is controlled to form gang holes.

6. The laser processing unit according to claim 4, which is controlled to form gang holes.

7. The laser processing unit according to claim 1, wherein the optical means comprises beam branching means in a path of the laser beam, guides each of laser beams resulting from branching into the processing area, and focuses each of the guided laser beams thereon.

8. The laser processing unit according to claim 7, which is controlled to form grid holes.

9. The laser processing unit according to claim 1, which is configured as a flat rectangular parallelepiped having the processing area formed therein as a depressed portion.

10. The laser processing unit according to claim 1, wherein the optical means is formed in a cartridge case and the cartridge case is provided detachable from the unit one half portion of the casing.

11. A laser processing apparatus comprising the laser processing unit as recited in claim 1, the laser processing unit being disposed on a stage detachably therefrom.

12. The laser processing apparatus according to claim 11, wherein the laser processing unit and a punching unit are juxtaposed on the stage and a work is processed by selectively using the laser processing unit or the punching unit.

13. The laser processing apparatus according to claim 11, wherein
    a plurality of the laser processing units are disposed on the stage and
    a laser beam emitted from a single laser oscillator or each of a plurality of laser oscillators is supplied in divided relation to a plurality of laser units via a plurality of optical fiber cables.

14. The laser processing apparatus according to claim 12, wherein
    a plurality of the laser processing units are disposed on the stage and
    a laser beam emitted from a single laser oscillator or each of a plurality of laser oscillators is supplied in divided relation to a plurality of laser units via a plurality of optical fiber cables.

* * * * *

UNITED STATES PATENT AND TRADEMARK OFFICE
CERTIFICATE OF CORRECTION

PATENT NO. : 6,818,858 B2
DATED : November 16, 2004
INVENTOR(S) : H. Yasoda et al.

It is certified that error appears in the above-identified patent and that said Letters Patent is hereby corrected as shown below:

<u>Title page,</u>
Item [30], Foreign Application Priority Data, should read
-- January 30, 2002 (JP) 2002-022287 --

Signed and Sealed this

Twelfth Day of July, 2005

JON W. DUDAS
*Director of the United States Patent and Trademark Office*